(12) United States Patent
Chen et al.

(10) Patent No.: US 9,063,011 B2
(45) Date of Patent: Jun. 23, 2015

(54) METHOD OF SIGNAL ADJUSTMENT IN AN OPTICAL SENSING DEVICE AND THE OPTICAL SENSING DEVICE

(75) Inventors: Meng-Kun Chen, New Taipei (TW); Chun-Hsien Lin, New Taipei (TW); Yi-Tsung Li, New Taipei (TW)

(73) Assignee: Dyna Image Corporation, New Taipei (TW)

( * ) Notice: Subject to any disclaimer, the term of this patent is extended or adjusted under 35 U.S.C. 154(b) by 1044 days.

(21) Appl. No.: 13/074,254

(22) Filed: Mar. 29, 2011

(65) Prior Publication Data
US 2012/0112044 A1 May 10, 2012

(30) Foreign Application Priority Data
Nov. 10, 2010 (CN) .......................... 2010 1 0542360

(51) Int. Cl.
*G01J 1/44* (2006.01)
*G01J 1/16* (2006.01)

(52) U.S. Cl.
CPC ...................................... *G01J 1/1626* (2013.01)

(58) Field of Classification Search
CPC ....... H04N 5/33; H04N 5/2258; H04N 5/225; H01L 27/14; H01L 27/142; H01L 27/146; H01L 27/14643; H01L 27/14645; H01L 27/14647; H01L 27/14649; H01L 27/1465; H01L 27/14652; H01L 27/14658; H01L 27/14659; H01L 27/14661; H01L 27/14667

USPC ............ 250/214 R, 205, 214.1, 214 AL, 221, 250/208.1

See application file for complete search history.

(56) References Cited

U.S. PATENT DOCUMENTS

| 5,003,378 A * | 3/1991 | Murao ........................ 348/226.1 |
| 2008/0111894 A1* | 5/2008 | Tanimoto .................... 348/222.1 |
| 2010/0103268 A1* | 4/2010 | Tokuyama ..................... 348/162 |
| 2010/0289885 A1* | 11/2010 | Lu et al. .......................... 348/61 |

* cited by examiner

*Primary Examiner* — Pascal M Bui Pho
(74) *Attorney, Agent, or Firm* — Rosenberg, Klein & Lee

(57) ABSTRACT

A method of signal adjustment in an optical sensing device is provided. The optical sensing device includes a first optical sensor and a first reference optical sensor. The first optical sensor corresponds to a first specified ideal spectral response and generates a first output signal corresponding to light detected thereby. The first reference optical sensor generates a first reference signal corresponding to light detected thereby, and is disposed adjacent to the first optical sensor such that the light detected by the first reference optical sensor is substantially the light detected by the first optical sensor. The method includes the steps of: a) receiving the first output signal and the first reference signal; and b) generating a first adjusted output signal having a spectral response that approximates the first specified ideal spectral response, by adjusting the first output signal according to the first reference signal.

17 Claims, 3 Drawing Sheets

METHOD OF SIGNAL ADJUSTMENT IN AN OPTICAL SENSING DEVICE AND THE OPTICAL SENSING DEVICE

CROSS-REFERENCE TO RELATED APPLICATION

This application claims priority of Chinese Application No. 201010542360.6, filed on Nov. 10, 2010.

BACKGROUND OF THE INVENTION

1. Field of the Invention

The present invention relates to an optical sensing device and a method of signal adjustment in the optical sensing device. 2. Description of the Related Art Nowadays, a coating or an optical filter is used for filtering out the light that is undesired to be received by an optical sensor. In the case of a red light optical sensor, a specified coating or optical filter is used for filtering out light outside the red light spectrum such that the red light optical sensor generally receives only the red light. Thus, an output signal of the red light optical sensor may have a spectral response that approximates an ideal spectral response to the red light.

However, most light filtering materials cannot achieve an expected effect. For example, the light filtering material for filtering out blue and green visible light is usually not effective to filter out the non-visible infrared light. Therefore, multiple coatings or various optical filters are generally used for the purpose of effectively filtering the light. However, such technique may complicate the manufacturing procedure, increase the manufacturing cost, and lower the yield of the optical sensor.

SUMMARY OF THE INVENTION

Therefore, an object of the present invention is to provide a method of signal adjustment in an optical sensing device.

According to one aspect of the present invention, there is provided a method of signal adjustment in an optical sensing device. The optical sensing device includes a first optical sensor and a first reference optical sensor. The first optical sensor corresponds to a first specified ideal spectral response and generates a first output signal corresponding to light detected thereby. The first reference optical sensor generates a first reference signal corresponding to light detected thereby, and is disposed adjacent to the first optical sensor such that the light detected by the first reference optical sensor is substantially the light detected by the first optical sensor.

The method is to be implemented using a processing unit and comprises the steps of:

a) configuring the processing unit to receive the first output signal from the first optical sensor and the first reference signal from the first reference optical sensor; and b) configuring the processing unit to generate a first adjusted output signal having a spectral response that approximates the first specified ideal spectral response, by adjusting the first output signal according to the first reference signal.

Another object of the present invention is to provide an optical sensing device capable of adjusting an output signal of an optical sensor thereof.

According to another aspect, an optical sensing device of the present invention comprises a first optical sensor, a first reference optical sensor, and a processing unit. The first optical sensor corresponds to a first specified ideal spectral response for generating a first output signal corresponding to light detected thereby. The first reference optical sensor is used for generating a first reference signal corresponding to light detected thereby, and is disposed adjacent to the first optical sensor such that the light detected by the first reference optical sensor is substantially the light detected by the first optical sensor. The processing unit is coupled to the first optical sensor and the first reference optical sensor for receiving the first output signal and the first reference signal therefrom, and is operable to generate a first adjusted output signal having a spectral response that approximates the first specified ideal spectral response, by adjusting the first output signal according to the first reference signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
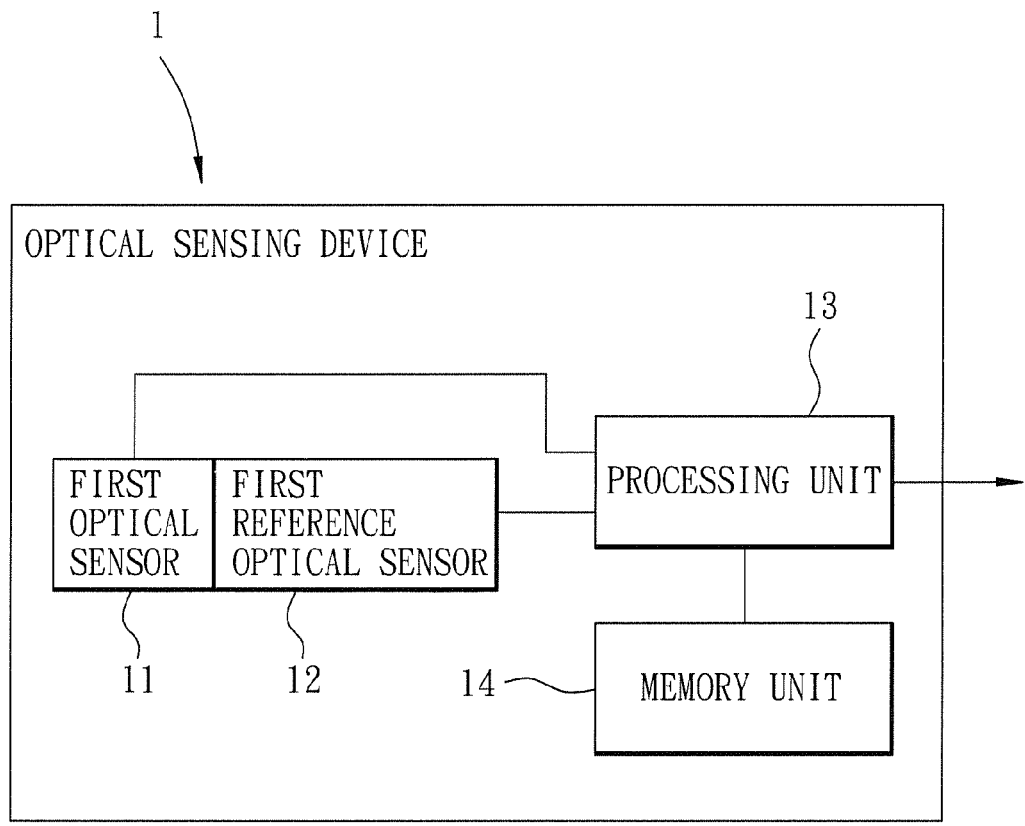
FIG. 1 is a block diagram of a first preferred embodiment of an optical sensing device according to the present invention.

Referring to FIG. 1, the first preferred embodiment of an optical sensing device 1 of this invention includes a first optical sensor 11, a first reference optical sensor 12 disposed adjacent to the first optical sensor 11, a processing unit 13 coupled to the first optical sensor 11 and the first reference optical sensor 12, and a memory unit 14 coupled to the processing unit 13. The first optical sensor 11 corresponds to a first specified ideal spectral response, and the first reference optical sensor 12 corresponds to a first reference spectral response different from the first specified ideal spectral response. The processing unit 13 can be implemented using software, firmware or hardware, or combinations thereof. The memory unit 14 may be a non-volatile memory, e.g., an erasable programmable read-only memory (EPROM). It should be noted that, in other embodiments, the optical sensing device 1 may include a plurality of the optical sensors and a plurality of the reference optical sensors for different products and applications.

The first optical sensor 11 is configured for generating a first output signal corresponding to light detected thereby, and the first reference optical sensor 12 is configured for generating a first reference signal corresponding to light detected thereby. It should be noted that, since the first reference optical sensor 12 is disposed adjacent to the first optical sensor 11, the light detected by the first reference optical sensor 12 is substantially the light detected by the first optical sensor 11. The processing unit 13 is operable to generate a first adjusted output signal having a spectral response that approximates the first specified ideal spectral response, by adjusting the first output signal according to the first reference signal in a manner to be described hereinafter.

Figure 2:
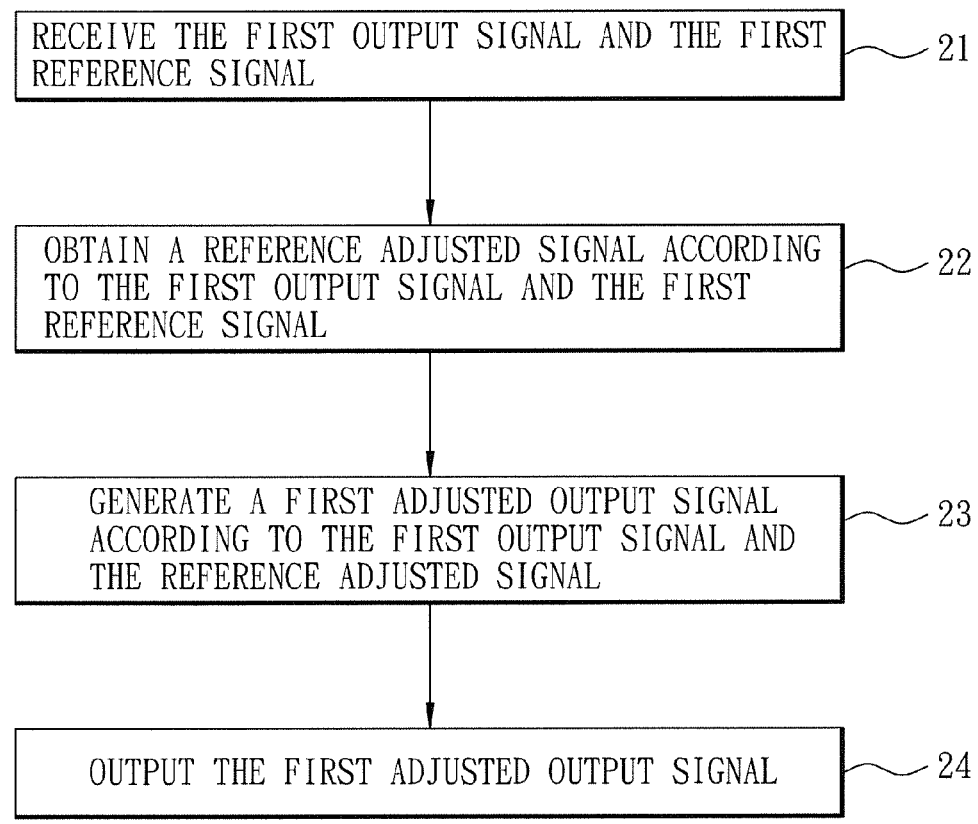
FIG. 2 is a flow chart of a method of signal adjustment in the optical sensing device of the first preferred embodiment.

Referring to FIGS. 1 and 2, the processing unit 13 is configured to implement a method of signal adjustment in the optical sensing device 1. The method includes the following steps.

In step 21, the processing unit 13 is configured to receive the first output signal from the first optical sensor 11 and the first reference signal from the first reference optical sensor 12.

In step 22, the processing unit 13 is configured to obtain a reference adjusted signal according to the first output signal and the first reference signal received in step 21. In this embodiment, the processing unit 13 is operable to utilize a first set of predefined parameters stored in the memory unit 14 to obtain the reference adjusted signal based upon the following Equation (1). Alternatively, in other embodiments, the processing unit 13 may be configured to obtain a plurality of the adjusted signals depending on the number of the first set of predefined parameters.

$$C\_R_k = \sum_{i=1}^{p} (a_{ki} \times S_i) + \sum_{j=1}^{q} (b_{kj} \times R_j) \quad (1)$$

In Equation (1), $C\_R_k$ is the $k^{th}$ one of the reference adjusted signals and k is equal to 1 in this embodiment, $a_{ki}$ and $b_{kj}$ are the first set of predefined parameters, p is the number of the optical sensors and is equal to 1 in this embodiment, $S_i$ is the output signal from the $i^{th}$ one of the optical sensors, q is the number of the reference optical sensors and is equal to 1 in this embodiment, and $R_j$ is the reference signal from the $j^{th}$ one of the reference sensors. In particular, Equation (1) can be simplified as Equation (2) in this embodiment since the optical sensing device 1 of this embodiment merely includes the first optical sensor 11 and the first reference optical sensor 12.

$$C\_R = a_1 \times S_1 + b_1 \times R_1 \quad (2)$$

The processing unit 13 is configured to generate the first adjusted output signal by adjusting the first output signal using the reference adjusted signal and a second set of predefined parameters based upon the following Equation (3) in step 23, and to output the first adjusted output signal in step 24. It should be noted that, in the case of the optical sensing device 1 that includes a plurality of the optical sensors, the processing unit 13 may be configured to generate a plurality of the adjusted output signals corresponding to the output signals of the optical sensors, respectively.

$$C\_S_i = c_i \times S_i + \sum_{k=1}^{r} (d_{ik} \times C\_R_k) \quad (3)$$

In Equation (3), $C\_S_i$ is the adjusted output signal corresponding to the $i^{th}$ one of the optical sensors, $c_i$ and $d_{ik}$ are the second set of predefined parameters, and r is the number of the reference adjusted signals ($C\_R_k$) and is equal to 1 in this embodiment. In particular, since the optical sensing device 1 of this embodiment merely includes the first optical sensor 11 and since the processing unit 13 is configured to obtain one reference adjusted signal ($C\_R$) in step 22, Equation (3) can be simplified as Equation (4) in this embodiment.

$$C\_S_1 = c_1 \times S_1 + d_1 \times C\_R \quad (4)$$

The first set of predefined parameters ($a_{ki}$ and $b_{kj}$) used in step 22 and the second set of predefined parameters ($c_i$ and $d_{ik}$) used in step 23 are stored in the memory unit 14, and are pre-obtained via repeated experimenting and testing of the first optical sensor 11 and the first reference optical sensor 12 that were manufactured under known manufacturing conditions (such as manufacturing procedure, materials used, etc.).

For example, when the first optical sensor 11 is a red light optical sensor, the first specified ideal spectral response thereof should be a red light spectral response. However, the first output signal of the first optical sensor 11 may be affected by non-visible light (such as infrared and ultraviolet) and interfering energy (such as leakage current and cross talk) such that the spectral response of the first output signal may differ from the red light spectral response. Therefore, the first and second sets of predefined parameters ($a_{ki}$ and $b_{kj}$, and $c_i$ and $d_{ik}$) are adjusted through repeated experimenting and testing, and can be used to adjust the first output signal to generate the first adjusted output signal that has a spectral response approximating the red light spectral response.

Thus, the optical sensing device 1 is capable of outputting the first adjusted output signal having a spectral response that approximates the first specified ideal spectral response. Namely, the virtue of the optical sensing device 1 according to this invention is the same as the first optical sensor 11 repeatedly coated or provided with additional optical filters for filtering out the undesired light. Further, the optical sensing device 1 of this invention is capable of eliminating the effect of interfering energy.

It should be noted that, in other embodiments, a mapping table may be pre-established through repeated experimenting and testing instead of using the first set of predefined parameters ($a_{ki}$ and $b_{kj}$) and the second set of predefined parameters ($c_i$ and $d_{ik}$). Thus, in steps 22 and 23, the processing unit 13 may be alternatively configured to obtain the first adjusted output signal according to the pre-established mapping table with reference to the first output signal of the first optical sensor 11 and the first reference signal of the first reference optical sensor 12.

Figure 3:
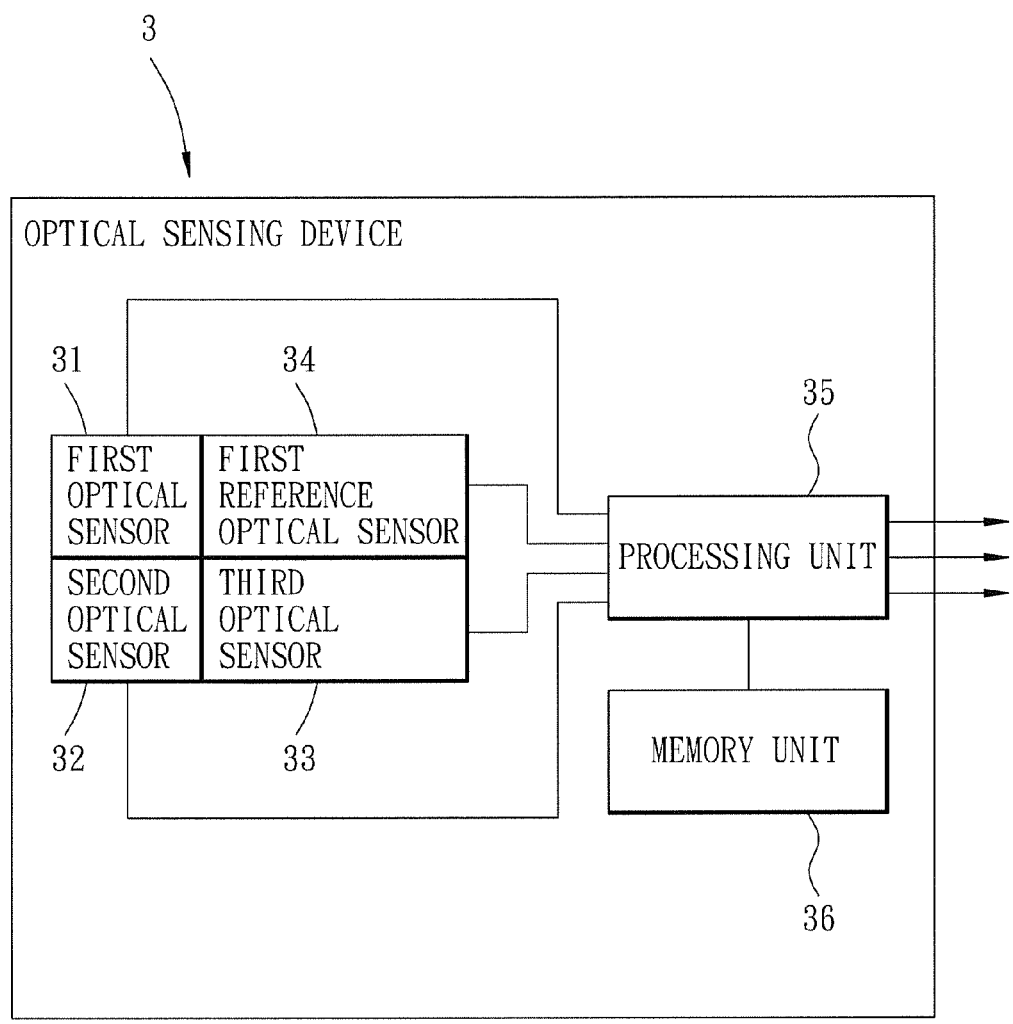
FIG. 3 is a block diagram of a second preferred embodiment of the optical sensing device according to the present invention.

Referring to FIG. 3, the second preferred embodiment of the optical sensing device 3 according to this invention includes three optical sensors (i.e., a first optical sensor 31, a second optical sensor 32, and a third optical sensor 33), a first reference optical sensor 34 disposed adjacent to the optical sensors 31-33, a processing unit 35 coupled to the optical sensors 31-33 and the first reference optical sensor 34, and a memory unit 36 coupled to the processing unit 35.

The first optical sensor 31 corresponds to a first specified ideal spectral response, the second optical sensor 32 corresponds to a second specified ideal spectral response, and the third optical sensor 33 corresponds to a third specified ideal spectral response. The first reference optical sensor 34 corresponds to a first reference spectral response different from the first, second and third specified ideal spectral responses.

The first optical sensor 31 is configured for generating a first output signal corresponding to light detected thereby, the second optical sensor 32 is configured for generating a second output signal corresponding to light detected thereby, the third optical sensor 33 is configured for generating a third output signal corresponding to light detected thereby, and the first reference optical sensor 34 is configured for generating a first reference signal corresponding to light detected thereby. It should be noted that the light detected by the first reference optical sensor 34 is substantially the light detected by each of the first, second and third optical sensors 31-33 since the first reference optical sensor 34 is disposed adjacent to each of the first, second and third optical sensors 31-33.

The processing unit 35 is operable, based upon Equations (1) and (3), to generate and output a first adjusted output signal corresponding to the first optical sensor 31, a second adjusted output signal corresponding to the second optical sensor 32, and a third adjusted output signal corresponding to the third optical sensor 33, by adjusting the first, second and third output signals, respectively. In particular, the first adjusted output signal may have a spectral response that approximates the first specified ideal spectral response, the second adjusted output signal may have a spectral response that approximates the second specified ideal spectral response, and the third adjusted output signal may have a spectral response that approximates the third specified ideal spectral response.

For example, the optical sensing device 3 of this embodiment is a color optical sensing device, the first optical sensor 31 is a red light optical sensor, the second optical sensor 32 is a green light optical sensor, and the third optical sensor 33 is a blue light optical sensor. In this case, the first specified ideal spectral response should be a red light spectral response, the second specified ideal spectral response should be a green light spectral response, and the third specified ideal spectral response should be a blue light spectral response. Accordingly, the spectral responses of the first, second and third adjusted output signals approximate the red, green and blue spectral responses, respectively.

In this embodiment, the processing unit 35 is configured to implement the steps of the method of signal adjustment as shown in FIG. 2. Since the steps are similar to those in the first embodiment, details thereof will be omitted herein for the sake of brevity.

In summary, by virtue of the reference optical sensor 12, 34 and the first and second sets of predefined parameters ($a_{ki}$ and $b_{kj}$, and $c_i$ and $d_{ik}$), the optical sensing device 1, 3 of this invention may operate to eliminate the effect from the undesired light without additional optical filters and coatings, and even to eliminate the effect from the interfering energy. Thus, the optical sensing device 1, 3 of this invention is capable of generating and outputting the adjusted output signal having the spectral response that is approximate to the specified ideal spectral response.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method of signal adjustment in an optical sensing device, the optical sensing device including a first optical sensor and a first reference optical sensor, the first optical sensor correlating to a first specified ideal spectral response and generating a first output signal corresponding to light detected thereby, the first reference optical sensor generating a first reference signal corresponding to light detected thereby and being disposed adjacent to the first optical sensor such that the light detected by the first reference optical sensor is substantially the light detected by the first optical sensor, said method to be implemented using a processing unit and comprising the steps of:
   a) configuring the processing unit to receive the first output signal from the first optical sensor and the first reference signal from the first reference optical sensor; and
   b) configuring the processing unit to generate a first adjusted output signal having a spectral response that approximates the first specified ideal spectral response, by adjusting the first output signal according to the first reference signal;
   wherein step b) includes
      b1) configuring the processing unit to obtain a reference adjusted signal based upon the first output signal, the first reference signal, and a first set of predefined calibration parameters, and
      b2) configuring the processing unit to generate the first adjusted output signal based upon $$C\_S = c \times S + d \times C_{13} R,$$

where $C\_S$ is the first adjusted output signal, c and d are a second set of predefined calibration parameters, S is the first output signal, and $C\_R$ is the reference adjusted signal.

2. The method as claimed in claim 1, wherein, in sub-step b1), the processing unit is configured to obtain the reference adjusted signal based upon $$C\_R = a \times S + b \times R,$$

where $C\_R$ is the reference adjusted signal, a and b are the first set of predefined calibration parameters, S is the first output signal, and R is the first reference signal.

3. A method of signal adjustment in an optical sensing device, the optical sensing device including a first optical sensor, a second optical sensor and a first reference optical sensor, the first optical sensor correlating to a first specified ideal spectral response and generating a first output signal corresponding to light detected thereby, the second optical sensor correlating to a second specified ideal spectral response for generating a second output signal corresponding to light detected thereby, the first reference optical sensor generating a first reference signal corresponding to light detected thereby and being disposed adjacent to the first optical sensor and the second optical sensor such that the light detected by the first reference optical sensor is substantially the light detected by the first optical sensor and the second optical sensor, said method to be implemented using a processing unit and comprising the steps of:
   a) configuring the processing unit to receive the first output signal from the first optical sensor, the first reference signal from the first reference optical sensor and the second output signal from the second optical sensor; and
   b) configuring the processing unit to generate a first adjusted output signal having a spectral response that approximates the first specified ideal spectral response, by adjusting the first output signal according to the first reference signal and a second adjusted output signal having a spectral response that approximates the second specified ideal spectral response, by adjusting the second output signal according to the first reference signal.

4. The method as claimed in claim 3, wherein step b) includes:
   b1) configuring the processing unit to obtain a reference adjusted signal based upon the first and second output signals, the first reference signal, and a first set of predefined calibration parameters; and
   b2) configuring the processing unit to generate the first adjusted output signal by adjusting the first output signal using the reference adjusted signal and a second set of predefined calibration parameters, and to generate the second adjusted output signal by adjusting the second output signal using the reference adjusted signal and the second set of predefined calibration parameters.

5. The method as claimed in claim 4, wherein, in sub-step b1), the processing unit is configured to obtain the reference adjusted signal based upon $$C\_R = a_1 \times S_1 + a_2 \times S_2 + b \times R,$$

where $C\_R$ is the reference adjusted signal, $a_1$, $a_2$ and b are the first set of predefined calibration parameters, $S_1$ is the first output signal, $S_2$ is the second output signal, and R is the first reference signal.

6. The method as claimed in claim 4, wherein, in sub-step b2), the processing unit is configured to generate each of the first and second adjusted output signals based upon $$C\_S_i=c_i\times S_i+d_i\times C\_R,$$

where $C\_S_i$ is the $i^{th}$ one of the adjusted output signals, $c_i$ and $d_i$ are the second set of predefined calibration parameters, $S_i$ is the $i^{th}$ one of the output signals, and $C\_R$ is the reference adjusted signal.

7. The method as claimed in claim 3, the optical sensing device further including a second reference optical sensor for generating a second reference signal corresponding to light detected thereby, the second reference optical sensor being disposed adjacent to the first and second optical sensors such that the light detected by the second reference optical sensor is substantially the light detected by the first and second optical sensors, wherein:
  in step a), the processing unit is further configured to receive the second reference signal from the second reference optical sensor; and
  in step b), the processing unit is configured to generate each of the first and second adjusted output signals according to the first and second reference signals.

8. The method as claimed in claim 7, wherein step b) includes:
  b1) configuring the processing unit to obtain a reference adjusted signal based upon the first and second output signals, the first and second reference signals, and a first set of predefined calibration parameters; and
  b2) configuring the processing unit to generate the first adjusted output signal by adjusting the first output signal using the reference adjusted signal and a second set of predefined calibration parameters, and to generate the second adjusted output signal by adjusting the second output signal using the reference adjusted signal and the second set of predefined calibration parameters.

9. The method as claimed in claim 8, wherein, in sub-step b1), the processing unit is configured to obtain the reference adjusted signal based upon $$C\_R=a_1\times S_1+a_2\times S_2+b_1\times R_1+b_2\times R_2,$$

where $C\_R$ is the reference adjusted signal, $a_1, a_2, b_1$ and $b_2$ are the first set of predefined calibration parameters, $S_1$ is the first output signal, $S_2$ is the second output signal, $R_1$ is the first reference signal, and $R_2$ is the second reference signal.

10. An optical sensing device comprising:
  a first optical sensor correlating to a first specified ideal spectral response for generating a first output signal corresponding to light detected thereby;
  a first reference optical sensor for generating a first reference signal corresponding to light detected thereby, said first reference optical sensor being disposed adjacent to said first optical sensor such that the light detected by said first reference optical sensor is substantially the light detected by said first optical sensor; and
  a processing unit coupled to said first optical sensor and said first reference optical sensor for receiving the first output signal and the first reference signal therefrom, and operable to obtain a reference adjusted signal based upon the first output signal, the first reference signal, and a first set of predefined calibration parameters, and generate a first adjusted output signal having a spectral response that approximates the first specified ideal spectral response, by adjusting the first output signal using the reference adjusted signal and a second set of predefined calibration parameters;

wherein said processing unit is operable to generate the first adjusted output signal based upon $$C\_S=c\times S+d\times C\_R,$$

where $C\_S$ is the first adjusted output signal, c and d are the second set of predefined calibration parameters, S is the first output signal, and $C\_R$ is the reference adjusted signal.

11. The optical sensing device as claimed in claim 10, wherein said processing unit is operable to obtain the reference adjusted signal based upon $$C\_R=a\times S+b\times R,$$

where $C\_R$ is the reference adjusted signal, a and b are the first set of predefined calibration parameters, S is the first output signal, and R is the first reference signal.

12. An optical sensing device comprising:
  a first optical sensor correlating to a first specified ideal spectral response for generating a first output signal corresponding to light detected thereby;
  a second optical sensor correlating to a second specified ideal spectral response for generating a second output signal corresponding to light detected thereby,
  a first reference optical sensor for generating a first reference signal corresponding to light detected thereby, said first reference optical sensor being disposed adjacent to said first optical sensor and said second optical sensor such that the light detected by said first reference optical sensor is substantially the light detected by said first optical sensor and said second optical sensor;
  a processing unit being coupled to said first optical sensor, said second optical sensor and said first reference optical sensor for receiving the first output signal, the second output signal and the first reference signal therefrom, being operable to generate a first adjusted output signal having a spectral response that approximates the first specified ideal spectral response, by adjusting the first output signal according to the first reference signal; and being operable to generate a second adjusted output signal having a spectral response that approximates the second specified ideal spectral response, by adjusting the second output signal according to the first reference signal, said processing unit being operable to obtain a reference adjusted signal based upon the first output signal, the second output signal, the first reference signal, and a first set of predefined calibration parameters, to generate the first adjusted output signal by adjusting the first output signal using the reference adjusted signal and a second set of predefined calibration parameters, and to generate the second adjusted output signal by adjusting the second output signal using the reference adjusted signal and the second set of predefined calibration parameters.

13. The optical sensing device as claimed in claim 12, wherein said processing unit is operable to obtain the reference adjusted signal based upon $$C\_R=a_1\times S_1+a_2\times S_2+b\times R,$$

where $C\_R$ is the reference adjusted signal, $a_1, a_2$ and b are the first set of predefined calibration parameters, $S_1$ is the first output signal, $S_2$ is the second output signal, and R is the first reference signal.

14. The optical sensing device as claimed in claim 12, wherein said processing unit is operable to generate each of the first and second adjusted output signals based upon $$C\_S_i=c_i\times S_i+d_i\times C\_R,$$

where $C\_S_i$ is the $i^{th}$ one of the adjusted output signals, $c_i$ and $d_i$ are the second set of predefined calibration parameters, $S_i$ is the $i^{th}$ one of the output signals, and $C\_R$ is the reference adjusted signal.

15. The optical sensing device as claimed in claim 12, further comprising a second reference optical sensor for generating a second reference signal corresponding to light detected thereby, said second reference optical sensor being disposed adjacent to said first and second optical sensors such that the light detected by said second reference optical sensor is substantially the light detected by said first and second optical sensors, said processing unit being coupled to said second reference optical sensor for receiving the second reference signal therefrom, and generating each of the first and second adjusted output signals according to the first and second reference signals.

16. The optical sensing device as claimed in claim 15, wherein said processing unit is operable to obtain a reference adjusted signal based upon the first and second output signals, the first and second reference signals, and a first set of predefined calibration parameters, to generate the first adjusted output signal by adjusting the first output signal using the reference adjusted signal and a second set of predefined calibration parameters, and to generate the second adjusted output signal by adjusting the second output signal using the reference adjusted signal and the second set of predefined calibration parameters.

17. The optical sensing device as claimed in claim 16, wherein said processing unit is operable to obtain the reference adjusted signal based upon $$C\_R=(a_1\times S_1+a_2\times S_2)+(b_1\times R_1+b_2\times R_2),$$

where $C\_R$ is the reference adjusted signal, $a_1$, $a_2$, $b_1$ and $b_2$ are the first set of predefined calibration parameters, $S_1$ is the first output signal, $S_2$ is the second output signal, $R_1$ is the first reference signal, and $R_2$ is the second reference signal.

\* \* \* \* \*